(12) United States Patent
Kumar et al.

(10) Patent No.: US 11,340,886 B2
(45) Date of Patent: *May 24, 2022

(54) METHODS AND SYSTEMS FOR MANAGING APPLICATION CONFIGURATIONS

(71) Applicant: Capital One Services, LLC, McLean, VA (US)

(72) Inventors: Lokesh Vijay Kumar, Frisco, TX (US); Poornima Bagare Raju, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/538,348

(22) Filed: Aug. 12, 2019

(65) Prior Publication Data

US 2020/0285456 A1 Sep. 10, 2020

Related U.S. Application Data

(63) Continuation of application No. 16/295,892, filed on Mar. 7, 2019, now Pat. No. 10,430,179.

(51) Int. Cl.
*G06F 9/44* (2018.01)
*G06F 8/65* (2018.01)
*G06F 8/71* (2018.01)
*G06F 11/36* (2006.01)

(52) U.S. Cl.
CPC .......... *G06F 8/65* (2013.01); *G06F 8/71* (2013.01); *G06F 11/3616* (2013.01); *G06F 11/3664* (2013.01)

(58) Field of Classification Search
CPC .......... G06F 8/65; G06F 11/3664; G06F 8/71; G06F 11/3616
See application file for complete search history.

(56) References Cited

U.S. PATENT DOCUMENTS

| 5,838,965 | A | * | 11/1998 | Kavanagh | G06F 9/454 |
| 5,950,006 | A | * | 9/1999 | Crater | G05B 19/0426 |
| | | | | | 717/127 |
| 5,953,524 | A | * | 9/1999 | Meng | G06F 9/44521 |
| | | | | | 717/108 |
| 5,995,753 | A | * | 11/1999 | Walker | G06F 8/24 |
| | | | | | 717/108 |
| 6,546,492 | B1 | * | 4/2003 | Walker | G06F 8/65 |
| | | | | | 726/3 |

(Continued)

OTHER PUBLICATIONS

Invitation to Pay Additional Fees PCT/US2020/021389 dated Jul. 16, 2020.

(Continued)

*Primary Examiner* — Adam Lee
(74) *Attorney, Agent, or Firm* — DLA Piper LLP US (57) ABSTRACT

Methods and systems for updating configurations. An application can be determined to be incorrectly configured. A request can be sent to update a configuration property. The configuration property can be updated in a test environment. The application can be tested with the updated configuration property in the test environment. The test of the application with the updated configuration property in the test environment can be identified as successful. An incorrect configuration of the application can be updated.

20 Claims, 6 Drawing Sheets

(56) References Cited

U.S. PATENT DOCUMENTS

| | | | | |
|---|---|---|---|---|
| 6,598,180 B1* | 7/2003 | Dryfoos | G06F 11/3664 | 714/38.13 |
| 6,766,514 B1* | 7/2004 | Moore | G06F 8/447 | 717/131 |
| 6,957,228 B1* | 10/2005 | Graser | G06F 9/4488 | 717/121 |
| 6,990,656 B2* | 1/2006 | Ersek | G06F 8/658 | 717/121 |
| 6,996,601 B1* | 2/2006 | Smith | G06Q 10/06 | 709/203 |
| 7,096,248 B2* | 8/2006 | Masters | G06F 11/3414 | 709/201 |
| 7,103,885 B2* | 9/2006 | Foster | G06F 8/71 | 717/170 |
| 7,130,938 B2* | 10/2006 | Brice, Jr | G06F 13/12 | 710/62 |
| 7,200,651 B1* | 4/2007 | Niemi | G06F 8/65 | 709/223 |
| 7,353,377 B2* | 4/2008 | Ong | G06F 9/4416 | 709/217 |
| 7,500,227 B1* | 3/2009 | Fontana | G06F 9/4484 | 717/127 |
| 7,523,471 B1* | 4/2009 | Dorn | G06F 9/44 | 719/331 |
| 7,613,599 B2* | 11/2009 | Bade | G06F 30/33 | 703/14 |
| 7,707,565 B2* | 4/2010 | Bertelsmeier | G06Q 10/00 | 717/143 |
| 7,836,031 B2* | 11/2010 | Howard | G06F 16/2358 | 707/702 |
| 7,900,200 B1* | 3/2011 | Violleau | G06F 9/4493 | 717/167 |
| 8,176,151 B2* | 5/2012 | Drake | G06F 8/71 | 709/220 |
| 8,239,498 B2 | 8/2012 | Kipatrick et al. | | |
| 8,549,494 B2* | 10/2013 | Neogi | G06N 3/126 | 717/143 |
| 8,572,138 B2* | 10/2013 | Sundar | G06F 8/60 | 707/828 |
| 8,607,203 B1* | 12/2013 | Mehra | G06F 11/3688 | 717/124 |
| 8,620,461 B2* | 12/2013 | Kihas | G05B 13/048 | 700/29 |
| 8,640,096 B2* | 1/2014 | Arcese | G06F 9/4401 | 717/120 |
| 8,751,626 B2* | 6/2014 | Pinkston | G06F 9/546 | 709/223 |
| 8,875,091 B1 | 10/2014 | Rouleau et al. | | |
| 8,966,487 B1* | 2/2015 | Leonard | G06F 9/54 | 718/101 |
| 2002/0023211 A1* | 2/2002 | Roth | G06F 9/44505 | 713/164 |
| 2002/0100017 A1* | 7/2002 | Grier | G06F 8/54 | 717/120 |
| 2002/0147972 A1* | 10/2002 | Olmeda | G06F 8/60 | 717/174 |
| 2003/0023707 A1* | 1/2003 | Ryan | G06F 9/4411 | 709/220 |
| 2003/0065826 A1* | 4/2003 | Skufca | H04L 67/142 | 719/315 |
| 2004/0103413 A1* | 5/2004 | Mandava | G06F 9/5044 | 718/100 |
| 2004/0148588 A1* | 7/2004 | Sadiq | G06F 9/44505 | 717/109 |
| 2004/0172407 A1* | 9/2004 | Arpirez Vega | H04L 41/0813 | |
| 2005/0028162 A1* | 2/2005 | Allen | G06F 9/5027 | 718/104 |
| 2005/0071838 A1* | 3/2005 | Hatasaki | G06F 8/64 | 717/168 |
| 2005/0132206 A1* | 6/2005 | Palliyil | G06F 21/645 | 713/188 |
| 2006/0020921 A1* | 1/2006 | Pasumansky | G06F 11/3636 | 717/124 |
| 2006/0075396 A1* | 4/2006 | Surasinghe | H04M 15/43 | 717/168 |
| 2006/0100909 A1* | 5/2006 | Glimp | G06Q 50/24 | 705/3 |
| 2006/0101436 A1* | 5/2006 | Anderson | G06F 9/45537 | 717/141 |
| 2006/0174228 A1* | 8/2006 | Radhakrishnan | G06F 9/383 | 717/127 |
| 2006/0184917 A1* | 8/2006 | Troan | G06F 11/3688 | 717/124 |
| 2006/0195825 A1* | 8/2006 | Vanspauwen | G06F 30/20 | 717/135 |
| 2007/0078877 A1* | 4/2007 | Ungar | G06F 40/151 | |
| 2007/0143739 A1* | 6/2007 | Taber, III | G06F 9/451 | 717/114 |
| 2007/0168919 A1* | 7/2007 | Henseler | G06F 8/61 | 717/101 |
| 2007/0213999 A1* | 9/2007 | Traub | G06K 7/01 | 340/572.1 |
| 2007/0266381 A1* | 11/2007 | Kaushik | G06F 9/44521 | 717/162 |
| 2008/0016466 A1* | 1/2008 | Grasser | G06F 8/36 | 715/835 |
| 2008/0016494 A1* | 1/2008 | Reinfelder | G06F 9/44505 | 717/121 |
| 2008/0066049 A1* | 3/2008 | Jain | G06F 21/6218 | 717/101 |
| 2008/0072250 A1* | 3/2008 | Osorio | H04N 21/8543 | 725/34 |
| 2008/0126390 A1* | 5/2008 | Day | G06F 11/3414 | |
| 2009/0070738 A1* | 3/2009 | Johnson | G06F 11/3688 | 717/106 |
| 2009/0198775 A1* | 8/2009 | Keinan | G06Q 10/06 | 709/205 |
| 2010/0037215 A1* | 2/2010 | Meiss | G06F 9/44505 | 717/168 |
| 2010/0049968 A1* | 2/2010 | Dimitrakos | H04L 63/0807 | 713/153 |
| 2010/0138674 A1* | 6/2010 | Dimitrakos | H04L 67/10 | 713/194 |
| 2010/0146481 A1 | 6/2010 | Binder et al. | | |
| 2011/0046775 A1* | 2/2011 | Bailey | B07C 3/02 | 700/224 |
| 2011/0078656 A1* | 3/2011 | Tsuta | G06F 8/20 | 717/110 |
| 2011/0126207 A1* | 5/2011 | Wipfel | H04L 63/0815 | 718/104 |
| 2011/0214113 A1* | 9/2011 | You | H04L 41/082 | 717/168 |
| 2012/0011496 A1* | 1/2012 | Shimamura | G06F 9/44536 | 717/170 |
| 2012/0131537 A1* | 5/2012 | Bond | G06F 8/36 | 717/100 |
| 2012/0137304 A1* | 5/2012 | Boullery | G06F 9/54 | 719/313 |
| 2012/0144398 A1* | 6/2012 | Chacko | G06F 11/3051 | 718/106 |
| 2012/0166421 A1* | 6/2012 | Cammert | G06F 16/24575 | 707/718 |
| 2012/0222015 A1* | 8/2012 | Bennett | G06F 11/3688 | 717/127 |
| 2012/0227044 A1* | 9/2012 | Arumugham | G06Q 10/06 | 718/100 |
| 2013/0263096 A1* | 10/2013 | Hulick | G06F 11/3495 | 717/130 |
| 2013/0290983 A1* | 10/2013 | Leinaweaver | G06F 9/541 | 719/313 |
| 2014/0033188 A1* | 1/2014 | Beavers | G06F 8/65 | 717/170 |
| 2014/0109046 A1* | 4/2014 | Hirsch | G06F 8/60 | 717/120 |
| 2014/0245305 A1* | 8/2014 | Miles | G06F 9/5083 | 718/100 |

(56) References Cited

U.S. PATENT DOCUMENTS

| | | | |
|---|---|---|---|
| 2014/0289738 A1* | 9/2014 | Paliwal | G06F 9/44 719/311 |
| 2014/0297833 A1* | 10/2014 | Bedini | H04L 43/0876 709/224 |
| 2014/0304701 A1* | 10/2014 | Zhang | G06F 8/70 717/174 |
| 2014/0359573 A1* | 12/2014 | Ajith Kumar | G06F 11/3612 717/113 |
| 2015/0040104 A1* | 2/2015 | Mall | G06F 9/44505 717/121 |
| 2015/0044642 A1* | 2/2015 | Resig | G09B 19/0053 434/118 |
| 2015/0067475 A1* | 3/2015 | Tuteja | G06F 40/14 715/234 |
| 2015/0106753 A1* | 4/2015 | Tran | G05B 23/0272 715/765 |
| 2015/0143358 A1* | 5/2015 | McElmurry | G06F 8/658 717/174 |
| 2015/0286489 A1* | 10/2015 | Brown, Jr | G06Q 30/0621 717/178 |
| 2015/0355897 A1* | 12/2015 | Ford | G06F 8/65 717/170 |
| 2015/0370598 A1* | 12/2015 | Bailey | G06F 9/44505 718/100 |
| 2015/0378720 A1 | 12/2015 | Gondek et al. | |
| 2016/0179656 A1* | 6/2016 | Yang | G06F 11/3664 717/124 |
| 2016/0246594 A1* | 8/2016 | Shoavi | G06F 8/65 |
| 2016/0378987 A1* | 12/2016 | Ferrara | G06F 21/53 726/1 |
| 2017/0090898 A1 | 3/2017 | Branson et al. | |
| 2017/0139725 A1* | 5/2017 | Koufogiannakis | G06F 8/71 |
| 2018/0121190 A1* | 5/2018 | Atchison | F24F 11/32 |
| 2018/0157481 A1 | 6/2018 | Zessin et al. | |
| 2018/0314513 A1* | 11/2018 | DiTullio | G06F 8/65 |
| 2018/0332116 A1* | 11/2018 | George | G06F 16/27 |
| 2019/0073227 A1* | 3/2019 | Zhong | G06F 9/4492 |
| 2019/0146902 A1* | 5/2019 | Jiang | G06F 11/3684 717/129 |
| 2019/0278637 A1* | 9/2019 | Sukhija | G06F 9/542 |
| 2019/0303175 A1* | 10/2019 | Irani | G06F 16/951 |
| 2020/0019411 A1* | 1/2020 | Nadella | G06F 11/3664 |
| 2020/0125956 A1* | 4/2020 | Ravi | G06K 9/6256 |
| 2020/0183673 A1* | 6/2020 | Dehmann | G06F 11/1433 |
| 2021/0165650 A1* | 6/2021 | Fiege | G06F 11/3692 |

OTHER PUBLICATIONS

International Search Report and Written Opinion from PCT/US2020/021389 dated Sep. 8, 2020.

* cited by examiner

METHODS AND SYSTEMS FOR MANAGING APPLICATION CONFIGURATIONS

CROSS-REFERENCE TO RELATED APPLICATION INFORMATION

This is a continuation of U.S. patent application Ser. No. 16/295,892, filed Mar. 7, 2019, the entirety of which is incorporated herein by reference.

FIELD

The present disclosure relates generally to managing application configurations.

BACKGROUND

If there is an issue with a property of an application, current solutions may require that a change management process be completed and then shut down the application so that it may be totally recreated so that the changes in the configuration file can be read to update the properties. Thus, there is a need to update applications in a more streamlined and efficient manner.

SUMMARY

According to one aspect, the present disclosure relates to a computer-implemented method for managing a configuration of an application, including: identifying a property of an application to update; sending a request to update the property to a change management process; causing the property of the application to be updated in a test environment; identifying that a test of the application with the updated property in the test environment was successful, and that the request was approved; causing the property of the application to be updated in a database after identifying that the test was successful and that the request was approved; and triggering a notification to be sent over a network to a computer system executing the application, the notification causing the application to refresh the property by replacing the property with the updated property from the database without restarting or recreating the application.

According to another aspect of the present disclosure, a system is provided for managing a configuration of an application, including: a first computer system configured to: identify a property of an application to update, send a request to update the property to a change management process, cause the property of the application to be updated in a database after identifying that the request was approved, and trigger a notification to be sent over a network; a second computer system different from the first computer system, configured to: execute the application, and refresh the property of the application by replacing the property with the updated property from the database without restarting or recreating the application, in response to receiving the notification over the network; and a third computer system different from the first and second computer systems, configured to: receive the request to update the property of the application, implement the change management process, and send an indication to the first computer system when the request has been approved.

According to another aspect of the present disclosure, a system is provided that manages a configuration of an application, including: a memory storing instructions; and a processor that, when executing the instructions, is configured to: identify a property of an application to update, send a request to update the property to a change management process, identify that the request was approved, cause the property of the application to be updated in a database after identifying that the request was approved, and trigger a notification to be sent over a network to a computer system executing the application, the notification causing the application to refresh the property by replacing the property with the updated property from the database without restarting or recreating the application.

According to another aspect, the present disclosure relates to causing information about properties of a new application to be stored in the database in response to receiving a request to register the new application.

According to another aspect, the present disclosure relates to a notification being sent, in some embodiments from a first computer system to a second computer system, over the network via an enterprise bus.

According to another aspect, the present disclosure relates to a first computer system triggering the notification to be sent over the network to a computer system executing the application, and the change management process being implemented in a second computer system different from the first computer system.

According to another aspect, the present disclosure relates to a first computer system triggering a notification to be sent over a network to a computer system executing the application, and automatically causing, by a second computer system, the notification to be sent over the network to the first computer system in response to identifying that the test was successful and that the request was approved.

According to another aspect of the present disclosure, a system is provided where the database is stored in the second computer system. In another aspect, the database is stored in a fourth computer system, the fourth computer system being different from the first, second, and third computer systems. In yet another aspect, a system is provided where a fifth computer system tests the application with the updated property, the fifth computer system being different from the first, second, third, and fourth computer systems.

According to another aspect of the present disclosure, the notification includes an address to the updated property, and the second computer system is further configured to retrieve the updated property from the database over the network based on the address.

According to another aspect of the present disclosure, the processor is further configured to present an indicator that a test of the application with the updated property was successful and to present an indicator that the request was approved, for display to an administrator.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure may: 1) identify application properties as configuration items; 2) register and identify applications; or 3) allow the system to have asynchronous communication with all the applications that are registered; or any combination thereof. Application properties can be persisted, instead of, for example, loading properties of an application on application start-up or when the application is refreshed. In this way, it may only take a new request to update or create a new or revised property on an application instance so that an entire application stack may not need to be restarted and/or recreated.

Using the systems and processes described herein, application property changes in production may not need to follow tedious management and change processes to get new instances up and running. Furthermore, externalizing application properties can help ensure that application properties are refreshed only when a command is issued and when it is needed. Unwanted refresh and reloads of properties may be prevented.

Figure 1:
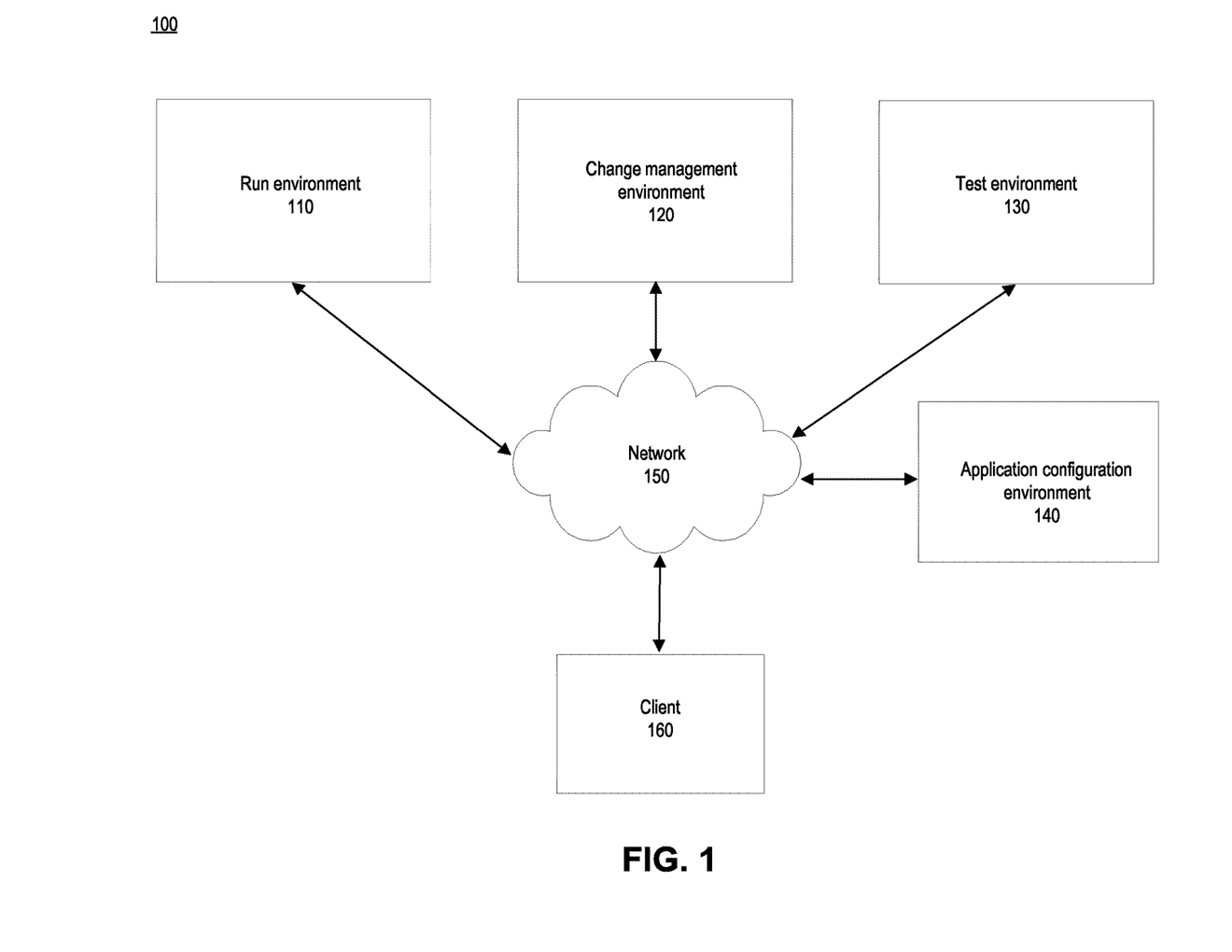
FIG. 1 is a diagram of an illustrative system 100 for managing configurations of applications, according to some embodiments of the present disclosure.

FIG. 1 is a diagram of an illustrative system 100 for managing configurations of applications, according to some embodiments of the present disclosure. Applications can be registered on this system. Every time an application property for a registered application needs an update, a new request can be created to send a command to the application to refresh its property.

For example, as shown in FIG. 1, a client 160 can access (e.g., over a network 150) properties for an application in an application configuration environment 140. A run environment 110 can cause the application to retrieve an updated property from the database over the network. A change management environment 120 can receive a request to change (e.g., update or add) a property for the application. A test environment 130 can allow the property of the application to be changed (e.g., updated or added) and tested.

Figure 2:
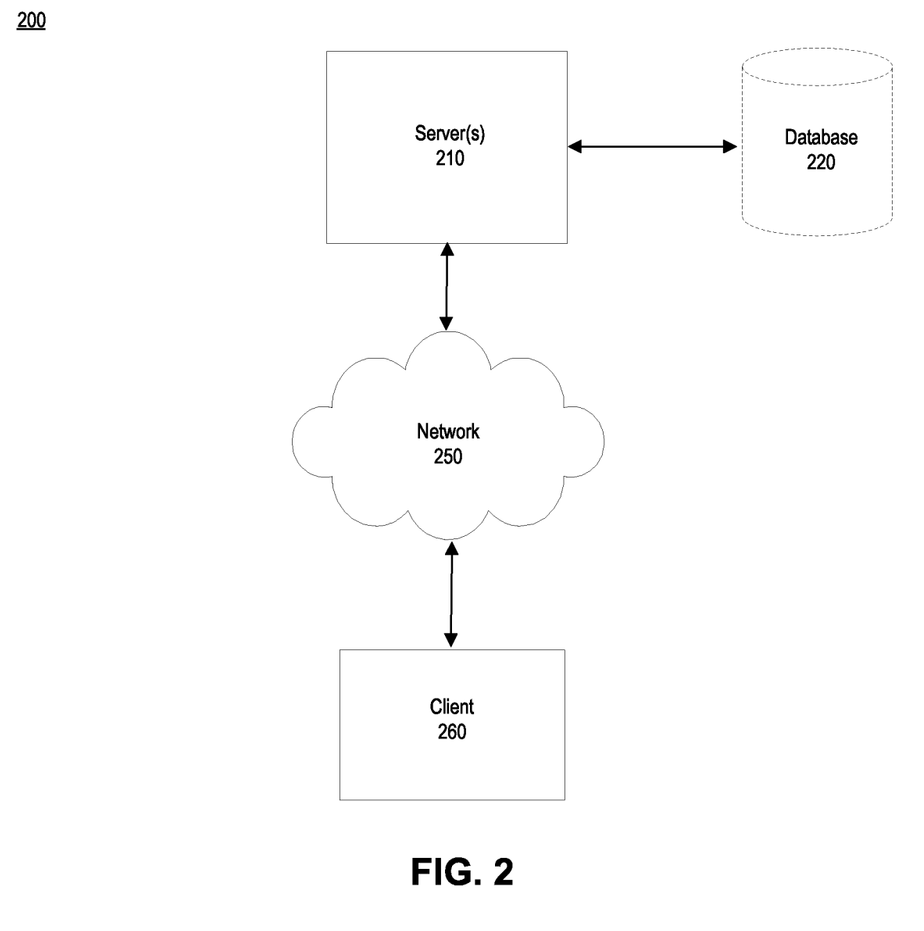
FIG. 2 is a diagram of an illustrative system 200 for managing a configuration of an application, according to some embodiments of the present disclosure.

FIG. 2 is a diagram of an illustrative system 200 for managing a configuration of an application, according to some embodiments of the present disclosure. A client 200 can communicate (e.g., thru a network 250) with a server 210. The server 210 can communicate with a database 220. In some embodiments, information about properties of a new application can be stored and/or updated in the database. (This can be done, for example, in response to receiving a request to register a new application.) Example options of saving properties include the following: 1) Having applications read new configurations from persistence storage on command from the application configuration environment 140. (With this approach, an external service may need to update the existing property, so that the application can pick up the new changes.) 2) A centralized properties storage can be kept for all applications (the application configuration environment 140 can itself store all properties) and trigger an application property refresh command for applications.

Figure 3:
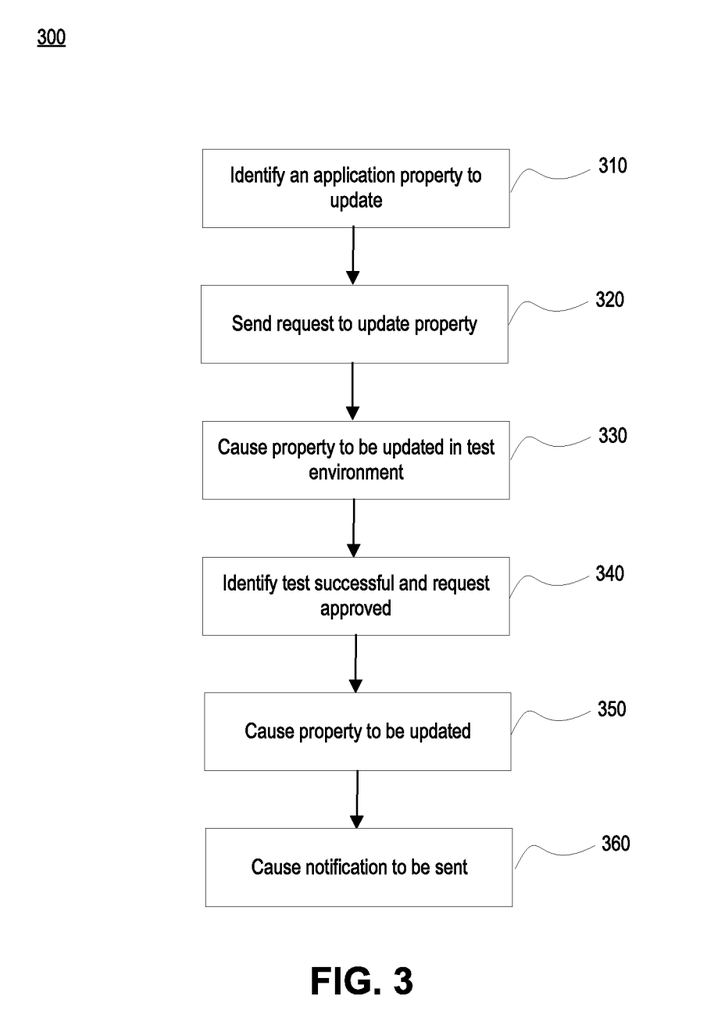
FIG. 3 is a flow diagram showing processing that may occur within the systems of FIGS. 1 and 2, according to some embodiments of the present disclosure.

FIG. 3 is a flow diagram showing processing that may occur within the systems of FIGS. 1 and 2, according to some embodiments of the present disclosure. In 310, a property of an application to update can be identified. In 320, a request to change (e.g., update or add) the property can be sent to a change management environment 120. In 330, the property of the application can be updated in a test environment 130. In 340, a test of the application with the updated property completed in the test environment 130 can be identified as successful, and the request can be approved. In 350, the property of the application can be updated in a database after identifying that the test was successful and that the request was approved. In 360, a notification can be sent (e.g., automatically) over a network (e.g., via an enterprise bus) to a computer system executing the application in response to identifying that a test of the application with the updated property was successful and that the request was approved. The notification can cause the application to refresh the property by replacing the property with the updated property from the database without restarting or recreating the application. The notification can include an address to the updated property, and the notification can cause the application to retrieve the updated property from the database over the network based on the address.

Figure 4A:
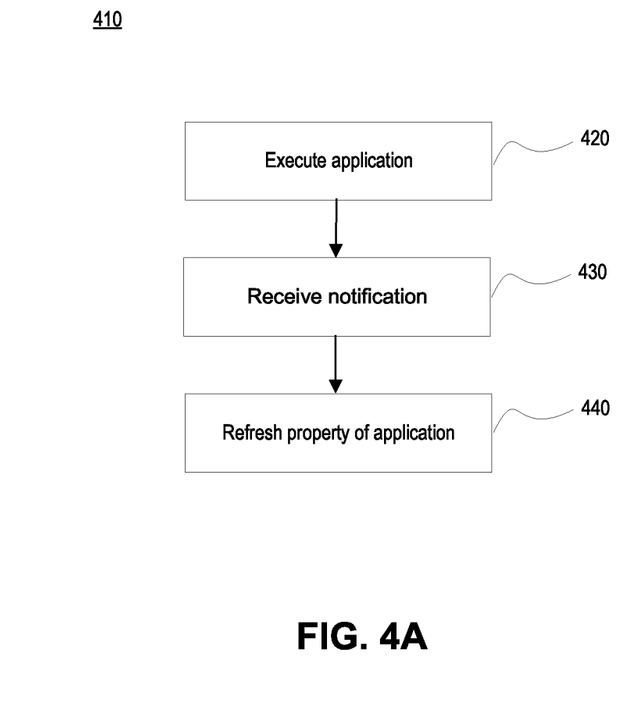
FIGS. 4A and 4B are the flow diagrams showing how the update and approval processes may occur separately, according to some embodiments of the present disclosure.
Figure 4B:
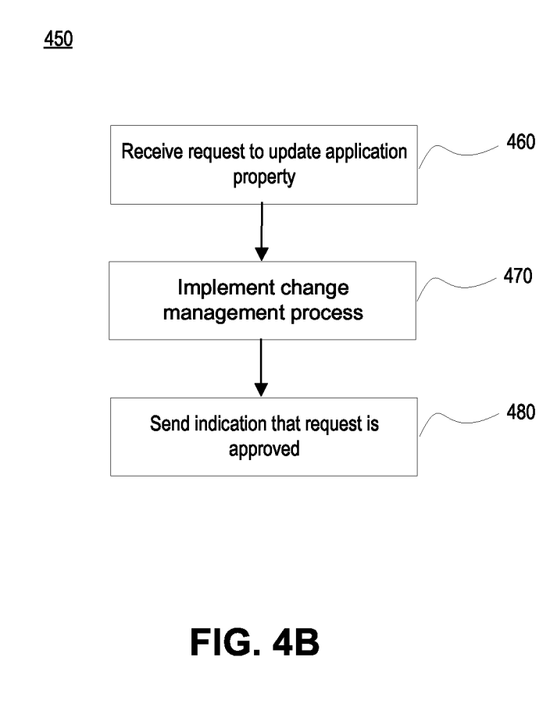

FIGS. 4A and 4B are the flow diagrams showing how the update and approval processes may occur separately, according to some embodiments of the present disclosure. In 410, an application can be updated. In 420, the application can be executed. In 430, a notification can be received. In 440, the property of the application can be refreshed. In 450, an update can be approved. In 460, a request to update an application property can be received. In 470, the change management process can be implemented. For example, a request to update the property can be sent over the network to the change management environment 120. In 480, an indication that a request is approved can be sent.

Figure 5:
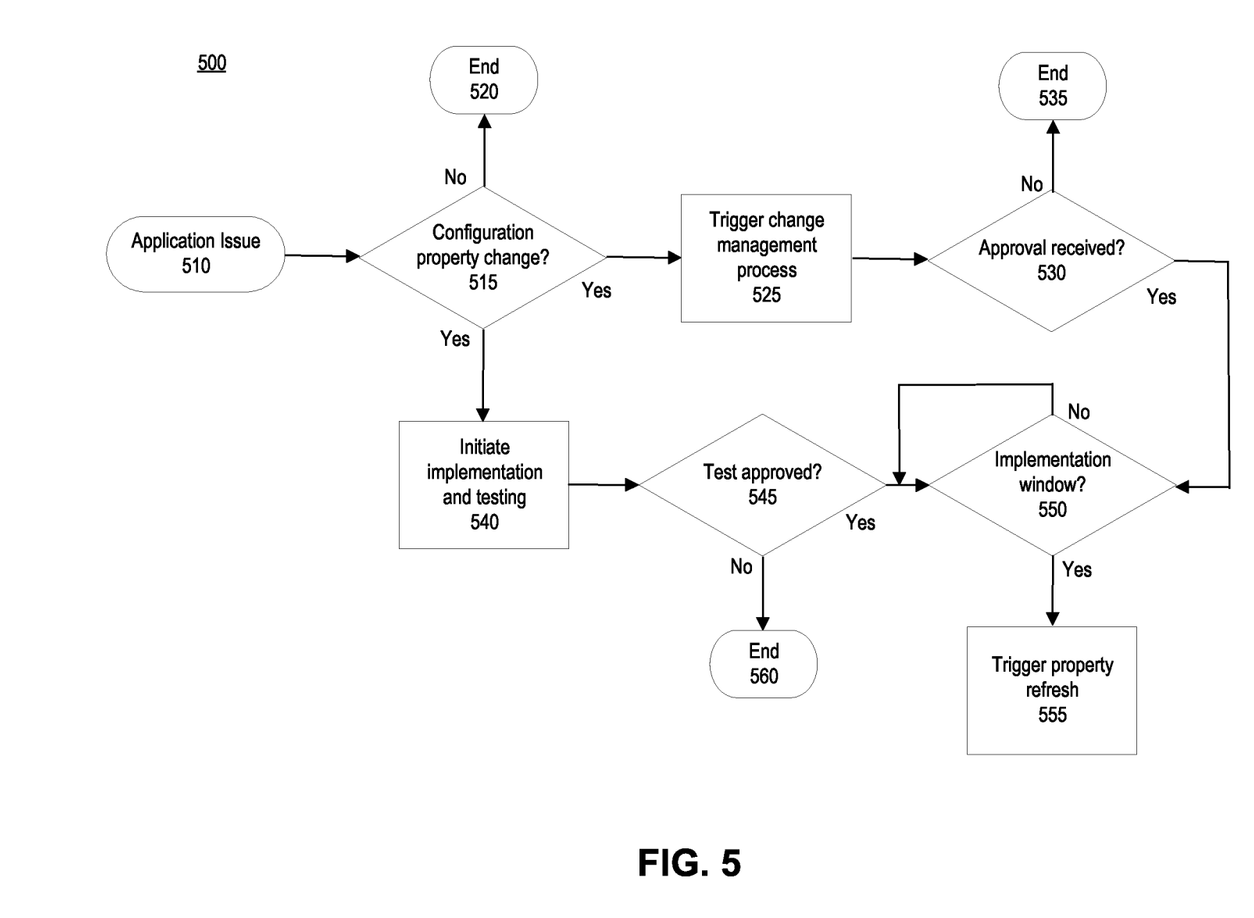
FIG. 5 is a flow diagram 500 showing processing that may occur within the systems of FIGS. 1 and 2, according to some embodiments of the present disclosure.

FIG. 5 is a flow diagram 500 showing processing that may occur within the systems of FIGS. 1 and 2, according to some embodiments of the present disclosure. In 510, an application issue can be identified. In 515, it can be determined if the change is a property configuration change. If no, in 520 the process can end. If yes, in 525 the change management process can be triggered. In 530, it can be determined if approval for the change is approved. If no, the process can end in 530.

In 540, implementation and testing can be initiated. In 545, it can be determined if the test was approved. If no, in 560 the process can end. If yes, in 550, it can be determined if it is the implementation window. If no, 550 can be repeated. If yes, in 555 the property refresh can be triggered.

As shown in FIG. 5, the approval and update processes can happen separately in some embodiments. In addition, in some embodiments, an indicator can be displayed to an administrator indicating that a request was approved and/or a test of the application with the updated property was successful.

As explained throughout this disclosure the disclosed systems and processes can: 1) identify application properties as configuration items; 2) register and identify applications; or 3) communicate (e.g., asynchronously) with all the applications that are registered; or any combination thereof. Applicant restarts and refreshes can be avoided or minimized. In addition, the system can be notified when a properties file for an application needs to be changed or refreshed.

In some embodiments, if a team builds an application, the application can be registered and the properties can be identified as configuration items and stored. If the system breaks down, the system can be notified that it needs to recover by reading a certain property file. New extensions may not be needed. All that may be needed is a notification to the system. If the application breaks the next day (e.g., because something was wrongly configured in a file, or something was wrongly configured in an external properties source), then the change management process can be completed, and the properties can be updated. Asynchronous communication can include triggers and notifications being sent asynchronously to refresh the configurations. For example, a production support person and a system reliability person can each independently trigger a notification to the application, letting it know that it needs to read its configuration again, and that is how it is going to recover.

If someone creates a change request to make a change in production, he may be able to track that through the system. So, the system is not just notifying an application, it can also track that the required approvals have been met. It can be a workflow-based trigger. For example, once a user has the approval, knows that it has been tested completely, and can see that status, that is where, during the implementation window a production support person can go ahead and trigger this notification to an application indicating it is time to refresh its properties (e.g., something is wrong).

In some embodiments, the system can be accessed by a particular employer provided role for supporting a production support team. This person may be able to track the change request, and may be able to trigger this notification to an application to notify it to recover from its broken properties.

For example, after a release, the next morning the production support team or application support team may be notified that there was something wrongly configured in the system (e.g., users are not able to connect to the right service or the right URL or are not able to do the right operation). It can be determined whether this is because of a configuration change. If so, the change management process can be triggered by creating: a change order, an urgent change order, or an emergency change order. The steps that need to take place can be described and the change can be allowed to be implemented during a window (e.g., such as after business hours). Rather than having a person initiate that process, steps can be created to update the relevant properties. For example, if the application was reading properties from a database, only steps necessary to update that database with the new configurations can be included. Another parallel thing that may be initiated is to start testing the application in a known, non-production environment, with the configuration changes. Once the test is done, and it is found that the new configuration works, then when the change management process has been completed, the change can be implemented. On an example system, if a user sees the change order approved, then a production support engineer can go ahead and trigger the notification. For example, if a user wants to fix a configuration tonight at 11:00, a production support team member can log into his system, look at the change order, and see that the testing was performed. The production support team member knows that the new properties are going to work, and that the change order was approved. Thus, they can trigger this notification through the system. And the existing application, which is broken, will read this notification, and refresh its configurations on its own (e.g., based on the notification).

In some embodiments, the system may talk with several different applications with a streaming or an enterprise bus, where they publish the notifications or the messages the applications are responsible for reading.

In some embodiments, the system can be centralized: All the configurations for the applications and the changes they are going through can be tracked. In addition, the application can continue to run when it receives a notification from the system and it retrieves the new configuration properties. The application does not need to be recreated, shut down, restarted, etc. Instead, the application can be told it needs to be refreshed, and the refreshing can be done (e.g., as a temporary memory write on a local machine). Notifications can be received, for example, by using a listener on a data stream or on the enterprise bus. For example, if kafka streaming is used, any application that is running can listen to the kafka stream and if they see a notification, they know they need to go refresh their properties.

In some embodiments, because applications can be registered and requests to change those applications can be tracked, notification can be sent to only the system(s) which is broken. Thus, for example, if there are three broken applications, three notifications will be sent to three different systems telling them to read their configurations.

Methods described herein may represent processing that occurs within a system for managing a configuration of an application (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 610 in FIG. 6) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 6:
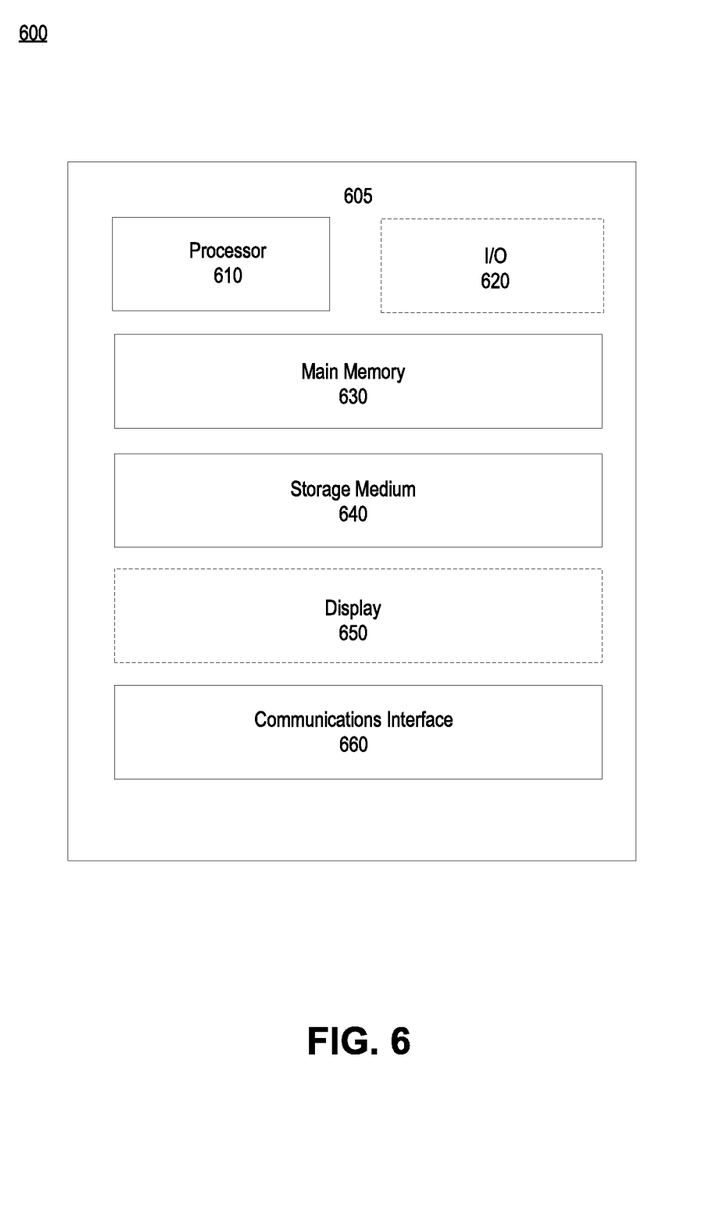
FIG. 6 illustrates an example computer 605, according to some embodiments of the present disclosure.

FIG. 6 illustrates an example computer 605, according to some embodiments of the present disclosure. Computer 605 can include a processor 610 suitable for the execution of a computer program, and can include, by way of example, both general and special purpose microprocessors, and any one or more processor of any kind of digital computer. A processor can receive instructions and data from a memory 630 (e.g., a read only memory or a random access memory or both). Processor 610 can execute instructions and the memory 630 can store instructions and data. A computer can include, or be operatively coupled to receive data from or transfer data to, or both, a storage medium 640 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 610 and the memory 630 can be supplemented by, or incorporated in, special purpose logic circuitry.

The computer 605 can also include an input/output 620, a display 650, and a communications interface 660.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method comprising:
determining that an application in a production environment is incorrectly configured, wherein the incorrect configuration is a changed configuration property of the application;
sending a request over a network to a change management process in a change management environment to update the configuration property;
receiving an indication from the change management process that the request to update the configuration property has been approved by the change management process;
updating the configuration property in a test environment connected to the network responsive to receiving the indication;
testing the application with the updated configuration property in the test environment;
identifying that the test of the application with the updated configuration property in the test environment was successful;
responsive to identifying the successful test, triggering a notification to be sent over the network to an application configuration environment, the notification causing the updated configuration property to be stored in persistent storage within the application configuration environment instead of loaded in the production environment;
retrieving the stored configuration property from the application configuration environment over the network; and
updating the incorrect configuration of the application in the production environment with the retrieved configuration property during a predetermined time period without restarting or recreating the application in the production environment.

2. The method of claim 1, further comprising:
displaying an indicator that the test of the application with the updated property was successful; and
displaying an indicator that the request was approved.

3. The method of claim 1, further comprising tracking a status of the request for the property as: the request is approved; the property is tested; or the property is updated; or any combination thereof.

4. The method of claim 1, wherein the request comprises urgent and/or non-urgent classifications.

5. The method of claim 1, wherein the request comprises steps that need to take place to implement the request.

6. The method of claim 1, wherein the configuration property is refreshed only when a command is issued.

7. A system comprising:
a memory storing instructions; and
a processor that, when executing the instructions, is configured to:
determine that an application in a production environment is incorrectly configured, wherein the incorrect configuration is a changed configuration property of the application;
send a request over a network to a change management process in a change management environment to update the configuration property;
receive an indication from the change management process that the request to update the configuration property has been approved by the change management process;

update the configuration property in a test environment connected to the network responsive to receiving the indication;
test the application with the updated configuration property in the test environment;
identify that the test of the application with the updated configuration property in the test environment was successful;
responsive to the identification of the successful test, trigger a notification to be sent over the network to an application configuration environment, the notification causing the updated configuration property to be stored in persistent storage within the application configuration environment instead of loaded in the production environment;
retrieve the stored configuration property from the application configuration environment over the network; and
update the incorrect configuration of the application in the production environment with the retrieved configuration property during a predetermined time period without restarting or recreating the application in the production environment.

8. The system of claim 7, wherein the processor, when executing the instructions, is further configured to:
display an indicator that the test of the application with the updated property was successful on a user interface; and
display an indicator that the request was approved on the user interface.

9. The system of claim 7, wherein the processor, when executing the instructions, is further configured to track a status of the request for the property as: the request is approved; the property is tested; or the property is updated; or any combination thereof.

10. The system of claim 7, wherein the request comprises urgent and/or non-urgent classifications.

11. The system of claim 7, wherein the request comprises steps that need to take place to implement the request.

12. The system of claim 7, wherein the configuration property is refreshed only when a command is issued.

13. A non-transitory computer readable storage medium storing instructions that when executed by a processor:
determine that an application in a production environment is incorrectly configured, wherein the incorrect configuration is a changed configuration property of the application;
send a request over a network to a change management process in a change management environment to update the configuration property;
receive an indication from the change management process that the request to update the configuration property has been approved by the change management process;
update the configuration property in a test environment connected to the network responsive to receiving the indication;
test the application with the updated configuration property in the test environment;
identify that the test of the application with the updated configuration property in the test environment was successful;
responsive to the identification of the successful test, trigger a notification to be sent over the network to an application configuration environment, the notification causing the updated configuration property to be stored in persistent storage within the application configuration environment instead of loaded in the production environment;
retrieve the stored configuration property from the application configuration environment over the network; and
update the incorrect configuration of the application in the production environment with the retrieved configuration property during a predetermined time period without restarting or recreating the application in the production environment.

14. The non-transitory computer readable medium of claim 13, wherein the processor, when executing the instructions, is further configured to:
display an indicator that the test of the application with the updated property was successful on a user interface; and
display an indicator that the request was approved on the user interface.

15. The non-transitory computer readable medium of claim 13, wherein the processor, when executing the instructions, is further configured to track a status of the request for the property as: the request is approved; the property is tested; or the property is updated; or any combination thereof.

16. The non-transitory computer readable medium of claim 13, wherein the request comprises urgent and/or non-urgent classifications.

17. The non-transitory computer readable medium of claim 13, wherein the request comprises steps that need to take place to implement the request.

18. The non-transitory computer readable medium of claim 13, wherein the configuration property is refreshed only when a command is issued.

19. The non-transitory computer readable medium of claim 13, wherein the request is sent over the network via an enterprise bus.

20. The non-transitory computer readable medium of claim 13, wherein the stored configuration property is retrieved from the application configuration environment based on an address of the stored configuration property.

* * * * *